March 23, 1965 A. G. RICARD 3,174,712
HOLD DOOR FOR AIRCRAFT FUSELAGE
Filed July 31, 1963 9 Sheets-Sheet 1
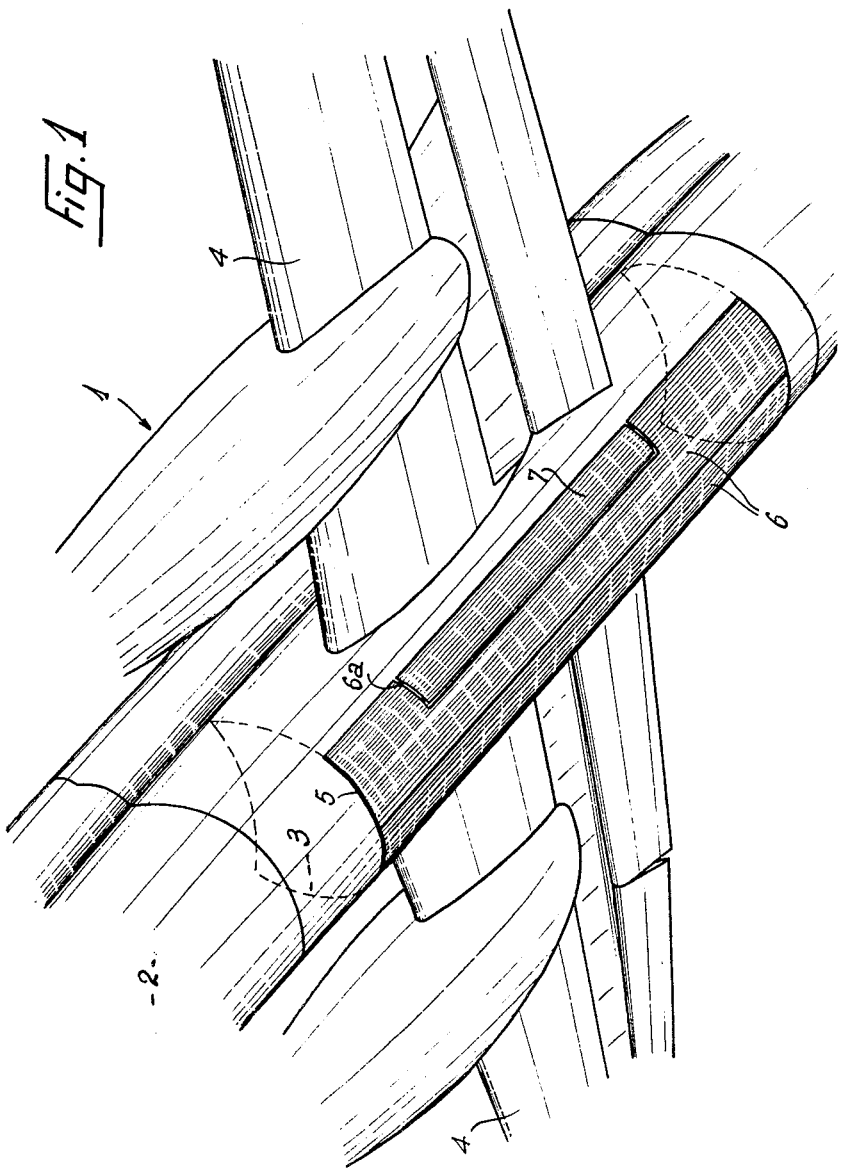

March 23, 1965  A. G. RICARD  3,174,712
HOLD DOOR FOR AIRCRAFT FUSELAGE
Filed July 31, 1963  9 Sheets-Sheet 2
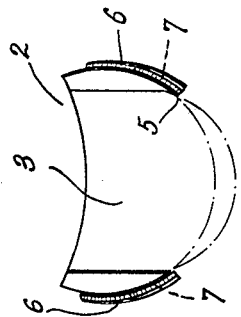
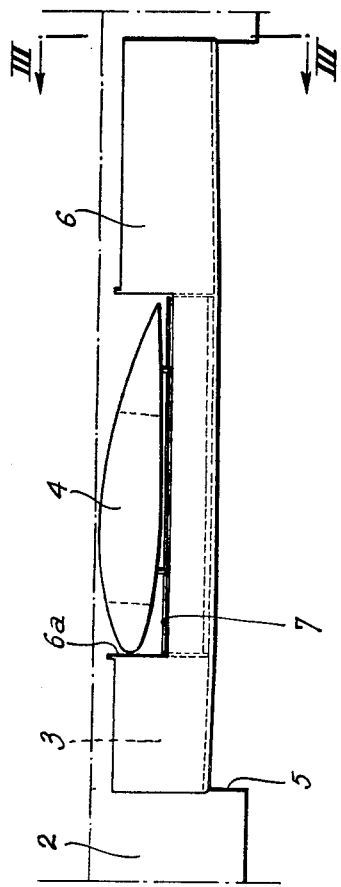

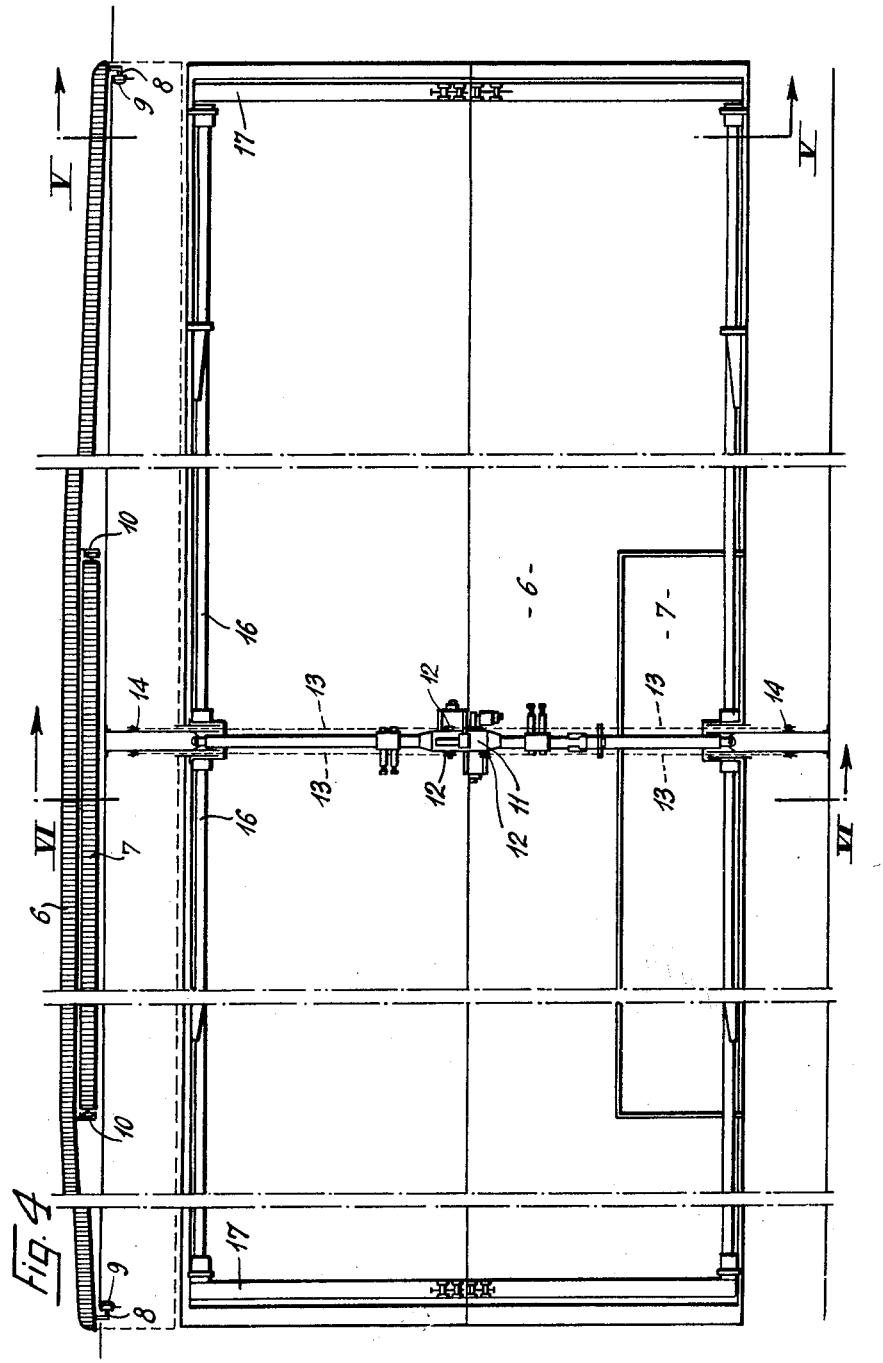

March 23, 1965  A. G. RICARD  3,174,712
HOLD DOOR FOR AIRCRAFT FUSELAGE

Filed July 31, 1963  9 Sheets-Sheet 4

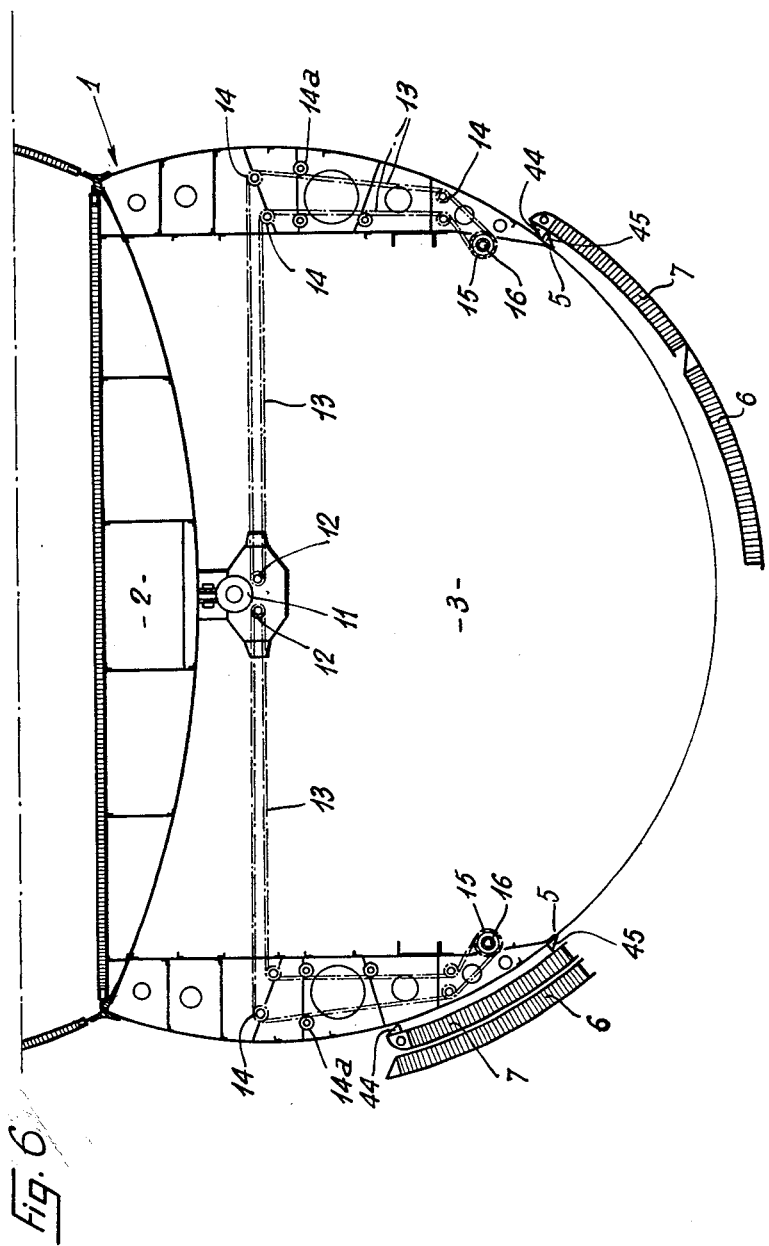

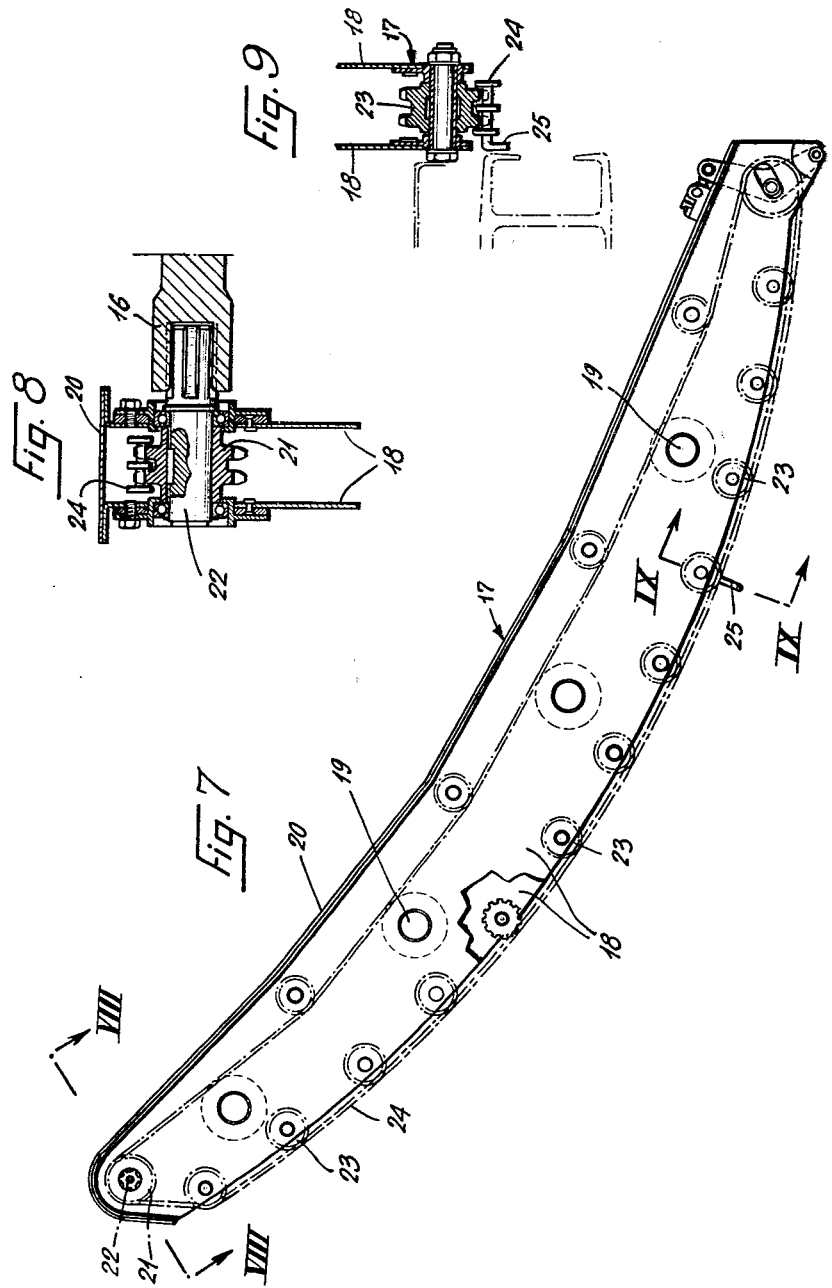

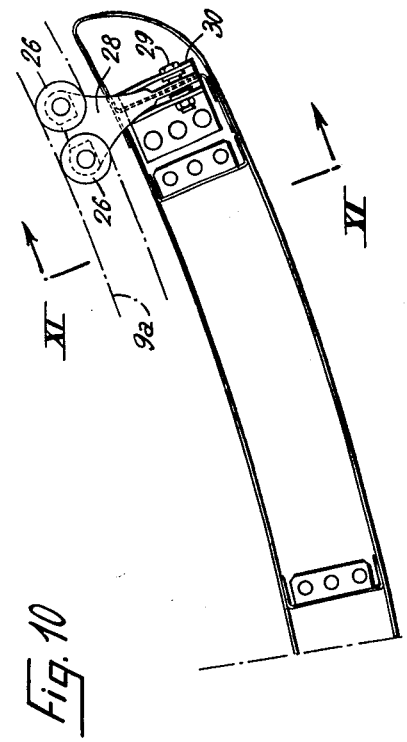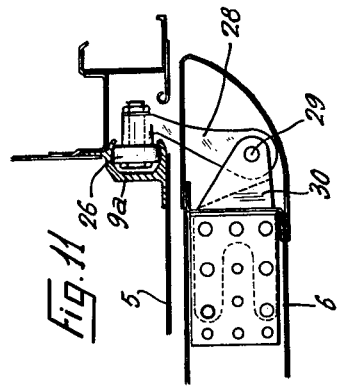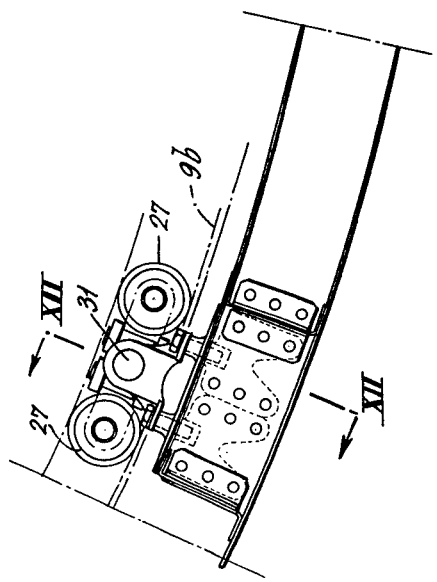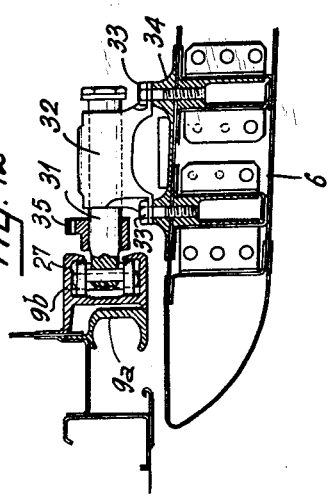

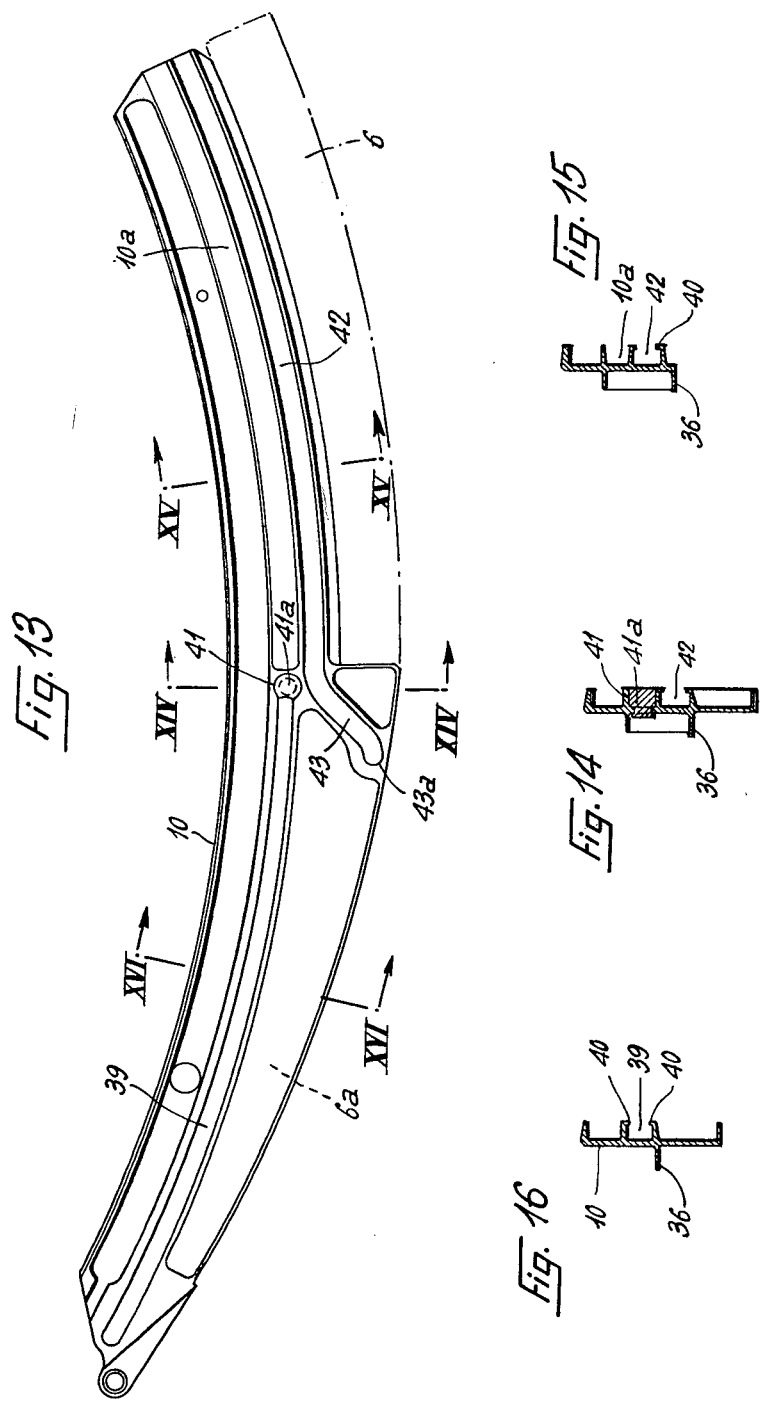

March 23, 1965 A. G. RICARD 3,174,712
HOLD DOOR FOR AIRCRAFT FUSELAGE
Filed July 31, 1963 9 Sheets-Sheet 9
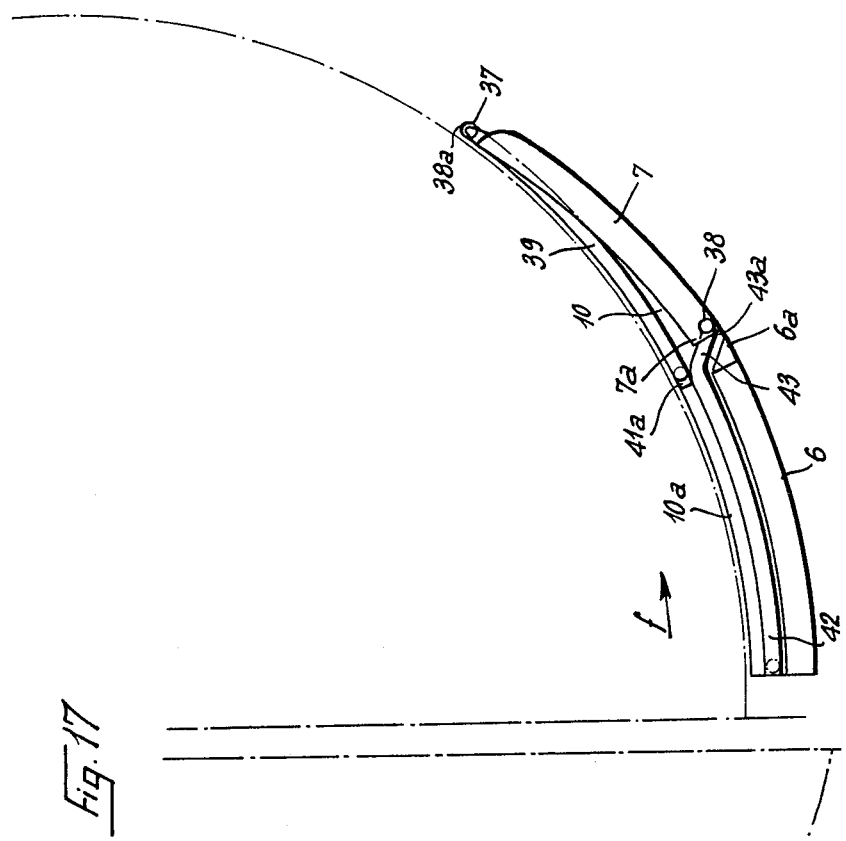
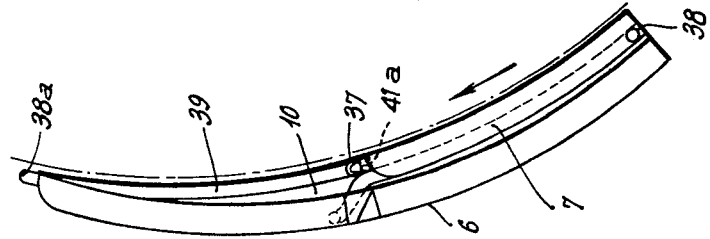
Fig. 17

3,174,712
HOLD DOOR FOR AIRCRAFT FUSELAGE
Armand G. Ricard, Viroflay, Seine-et-Oise, France, assignor to Societe Anonyme des Ateliers d'Aviation Louis Breguet, Paris, France, a company of France
Filed July 31, 1963, Ser. No. 298,893
Claims priority, application France, Sept. 25, 1962, 910,372
6 Claims. (Cl. 244—129)

It has already been proposed to constitute aircraft fuselages of two superposed lobes having a partially circular configuration, the upper lobe forming the main cabin, which may be pressurised, and the lower lobe forming a huge hold which is available for accommodating military or civil loads.

The object of the present invention is to provide a door which can be used in aircraft whose fuselage has, at least in its lower portion, a substantially circular cross-section and, more particularly, the present invention relates to aircraft of the type specified.

According to the invention, the said door has substantially the same shape as the portion of the fuselage on which it is mounted, and it is arranged to open slidably with a circular movement along the part or parts of the fuselage adjacent the opening which the door is adapted to close.

By means of the invention the hold opening can be completely unmasked on the ground and in flight, which facilitates the loading and unloading of the hold and also the launching of loads contained in the hold when the aircraft is in flight.

The bulk of the fuselage is considerably reduced when the door is opened, which has more particularly the result of reducing aerodynamic drag and the consequences of such drag on the equilibrium of the aircraft when in flight; a further result is the elimination of radar echoes.

Jacks or other transverse mechanisms for opening and closing, which encumber aircraft holds, are also dispensed with.

The invention is illustrated by way of example in the accompanying drawings, in which:

FIGURE 1 is a perspective view from below of part of an aircraft provided with a door having two leaves, according to the invention.

FIGURE 2 is a partial elevational view showing the door open.

FIGURE 3 is a sectional view on III—III of FIGURE 2.

FIGURE 4 is a partial plan view, in half-section, showing an open leaf and its guide means.

FIGURES 5 and 6 are sectional views on V—V and VI—VI of FIGURE 4.

FIGURE 7 is a detail view on a larger scale of a door control mechanism.

FIGURES 8 and 9 are sectional views on VIII—VIII and IX—IX of FIGURE 7.

FIGURE 10 is an end view of a leaf.

FIGURES 11 and 12 are sectional views on XI—XI and XII—XII respectively, of FIGURE 10.

FIGURE 13 is a view on a larger scale of the guide rail of the retractable panel.

FIGURES 14 to 16 are respectively sectional views on XIV—XIV, XV—XV and XVI—XVI of FIGURE 13, and FIGURE 17 is a diagrammatic view illustrating the operation of the panel.

Figure 5:
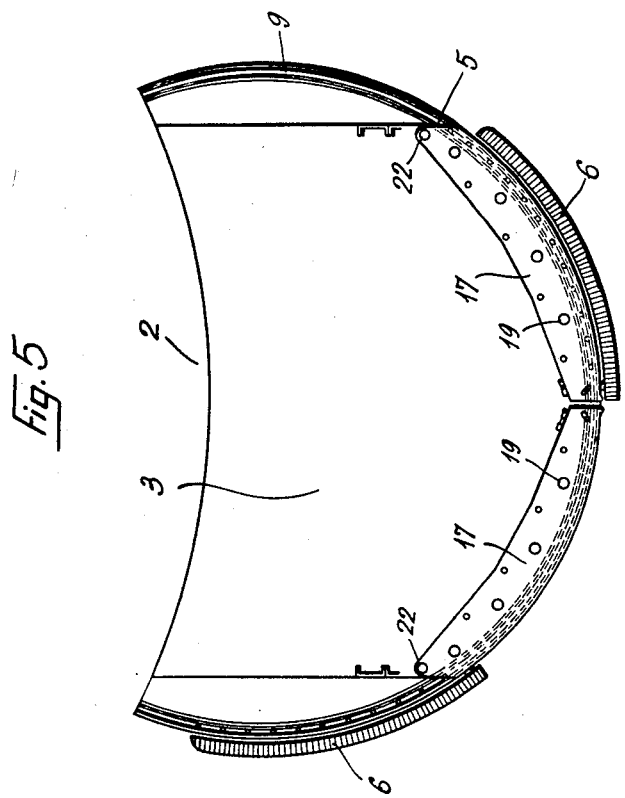

In the embodiment illustrated in the drawings, FIGURE 1 shows part of an aircraft 1 whose fuselage 2 comprises a hold 3 of partially circular cross-section. The wings 4 are connected to this portion of the fuselage. The hold 3 has a lower opening 5 which can be closed by a door having two leaves 6, also of partially circular shape.

The door is opened by sliding the leaves along the walls of the hold, as FIGURES 2 and 3 show particularly. A retractable panel 7 is provided in each leaf for permitting the complete opening of the door despite the presence of the wing, unmasking a recess 6a which passes about the root of the wing at the end of travel of the door leaf.

The leaves 6 are curved in the longitudinal sense to permit the retracting of the panel 7 between the door and the fuselage.

As can be seen from FIGURES 4 to 6, the leaves 6 roll by means of sets of wheels 8 provided on their ends on circular rails 9 which are fixed along the front and rear edges of the hold opening whereas the panels 7 each having wheels at their ends which are guided in rails 10 which are carried by the respective door leaves.

The opening and closing of the door are controlled from a central motor 11, for example a hydraulic motor, whose drive-output toothed wheels 12 are connected by means of chains 13 extending over guiding chain wheels 14 and guide pulleys 14a (FIGURE 6) to toothed wheels 15 which are fixed to the longitudinal shafts 16. The shafts 16 (FIGURE 4) are coupled at their ends to mechanisms 17 (FIGURE 5) which themselves are in engagement with the door leaves 6.

As will be seen more clearly from FIGURES 7 to 9, each of the mechanisms 17 comprises two bearing plates 18 which are connected by tubular struts 19 and are closed off from the interior of the hold by a casing 20.

Arranged between the bearing plates 18 are, on the one hand, a driving toothed wheel 21 whose shaft 22 is coupled to the corresponding shaft 16 (FIGURE 8) and on the other hand (FIGURE 9) guiding toothed wheels 23 over which passes a chain 24 carrying an attachment stud 25 by which it is connected to the corresponding leaf 6. Thus, the door can be closed or opened by operating the chain 24 in one or other direction. The leaves 6, one of which is shown in FIGURES 10 to 12, are preferably constructed by means of honeycomb-structure elements. Each leaf comprises at its ends sets of wheels 26 and 27 (which are indicated generally in FIGURE 4 by the reference numeral 8) rolling in rails 9. The upper set of wheels 26 is carried by a lever 28 articulated at 29 to a strap 30 fixed to the door leaf (FIGURE 11). The wheels 26 have a spherical rim and they slide in a circular-section upper portion 9a of the rail 9.

The set of lower wheels 27 (FIGURE 12) comprises four wheels arranged in twos and mounted on a pivot 31 which can rotate in a saddle 32 fixed by bolts 33 to anchoring parts 34 provided in the leaf 6. The wheels 27 roll in a rectangular section portion 9b of the rail 9. The pivot 31 carries a sleeve 35 with which the stud 25 of the chain 24 comes into engagement.

The rails 10 for guiding each of the panels 7 are fixed to the door leaf by means of dorsal strips 36 along the lateral edges of the recess 6a, and they are prolonged at 10a along the door leaf 6 below the said recess (FIGURE 13).

Each rail 10 comprises guide grooves 39 and 42 for the wheels 37 and 38 which are respectively mounted in the upper and lower ends of the panel 7 (FIGURE 17).

The guide groove 39 for the upper wheel 37 is simply, in the sense of its length, in the form of an arc of a circle. It has flanges 40 (FIGURE 16) preventing the wheel from escaping and is widened at 41 at its lower end in order to permit the introduction of the wheel.

When the said wheel 37 has been introduced into the groove 39 a stop 41a is put into position in order to stop the wheel 37 (FIGURES 13 and 14).

The groove 42 intended for the wheel 38 has also flanges 40; it comprises a portion 43 which is oblique towards the exterior and in the upward direction.

When the door is closed (FIGURE 17, on the right) the wheel 37 is situated at the upper end 38a of the groove 39 whereas the wheel 38 is situated in the end 43a of the portion 43.

When the door 6 ascends in the direction of the arrow, the wheel 38 first of all passes over the oblique portion 43, which enables the lower edge 7a of the panel 7 to avoid the corresponding edge of the recess 6a.

The panel 7 is thus retracted within the interior portion of the door 6. Half-way along the travel of the door 6, the stop 41a fixed on the lower end of the groove 39 acts on the wheel 37 and drives the panel 7 to the position of complete opening shown on the left of FIGURE 17.

On closing, the reverse process is carried out. The door leaf 6 begins by entraining in its travel the panel 7 by engagement of the wheel 37 until the said panel, by studs 44 for example, comes to a halt on stops 45 fixed to the edge of the opening 5 of the hold (FIGURE 6). The door leaf 6 then continues its travel until complete closure is obtained (FIGURE 17, right-hand side).

What I claim is:

1. In an aircraft having a fuselage a lower portion of which has an arcuate cross-section and is formed with a longitudinally extending hold opening, and a pair of wings attached to said fuselage on both sides of said opening respectively, said wings having a root length smaller than the length of said hold opening, a sliding door comprising a pair of rigid leaves each having an arcuate cross-section with a radius of curvature substantially equal to that of said lower portion, means for mounting said leaves outwardly of said lower portion on either sides of said opening respectively, whereby said leaves are rendered slidable along said lower portion between a position in which they close said opening and an open position; said leaves each comprising opposite said wings a recess the length of which is greater than the root length of said wings; a pair of rails mounted on each of said leaves along the transversal edges of said recesses respectively; a panel slidable in each pair of said rails between a position in which it closes said recess and a position in which said recess is unmasked; and means for coordinating the sliding movements of said leaves and panels, whereby said recesses are closed when said leaves are closed and said recesses are open when said leaves are open.

2. The combination of claim 1 wherein each said panel is provided with wheels mounted at the ends of its transversal edges and said rails have a pair of grooves parallel to said lower portion and adapted to receive said wheels, respectively, the groove for the wheel remote from the corresponding wing comprising an upper portion oblique towards the exterior of the door leaf, whereby said panel may be located flush with said left when said left is closed and may be slid open into position between said leaf and the fuselage as said leaf is opened and cooperating stops on said panel and said fuselage for arresting said panel and maintaining it in its outermost open position suitable for closure upon closure of said leaf.

3. In an aircraft having a fuselage a lower portion of which has an arcuate cross-section and is formed with a longitudinally extending hold opening, a sliding door comprising a pair of rigid leaves each having an arcuate cross-section with a radius of curvature substantially equal to that of said lower portion and respectively located on both sides of said opening; a first set of wheels mounted on said leaves at the end of the transversal edges thereof remote from said hold opening; a second set of wheels mounted on said leaves at the other end of said transversal edges; said second set of wheels being mounted on a supporting member pivoted on said leaves; a first rail mounted on said fuselage adjacent each lateral edge of said hold opening, to accommodate said first set of wheels; a second rail mounted on said fuselage adjacent each lateral edge for accommodating said second set of wheels, whereby said leaves may be mounted on said fuselage outwardly of said aircraft; a chain mechanism mounted on said fuselage adjacent each of said rails, said chain mechanism being provided with means for engaging said supporting member; and means for driving said chain mechanisms, whereby said leaves may be moved between a position wherein said hold opening is closed and a position wherein said opening is open.

4. The combination of claim 3 wherein the wheels of said first set have spherical rims, each said first rails have a part-circular cross-section and said wheels are mounted onto said leaves by means of a pivoted lever.

5. The combination of claim 3 wherein each said chain mechanism comprises a pair of bearing plates perpendicular to the outer wall of said lower portion and the outer edges of which are substantially flush with said wall; a plurality of toothed wheels mounted between said plates along said outer edges, a driving toothed wheel and guiding toothed wheels mounted also between said plates and an endless chain passing on said toothed wheels, said means for engaging said supporting member being carried by said chain.

6. The combination of claim 5 wherein the driving toothed wheels located on the opposite sides of said hold opening are connected two by two, by longitudinal shafts and a central motor for driving said shafts.

References Cited by the Examiner
UNITED STATES PATENTS

| 1,413,895 | 4/22 | Claveria | 160—116 |
| 2,378,856 | 6/45 | Laddon et al. | 244—129 |
| 2,739,645 | 3/56 | Urquhart | 20—19 |
| 2,752,114 | 6/56 | Calvy | 244—129 |
| 2,864,526 | 12/58 | Buss | 160—222 |

FERGUS S. MIDDLETON, *Primary Examiner.*

UNITED STATES PATENT OFFICE
CERTIFICATE OF CORRECTION

Patent No. 3,174,712                          March 23, 1965

Armand G. Ricard

It is hereby certified that error appears in the above numbered patent requiring correction and that the said Letters Patent should read as corrected below.

Column 3, line 54, for "left", each occurrence, read -- leaf --.

Signed and sealed this 3rd day of August 1965.

(SEAL)
Attest:

ERNEST W. SWIDER
Attesting Officer

EDWARD J. BRENNER
Commissioner of Patents